Patented Oct. 9, 1951

2,570,537

UNITED STATES PATENT OFFICE 2,570,537

PREPARATIONS FOR USE IN AGRICULTURE AND HORTICULTURE

Eric George Finch, Sandhurst, England

No Drawing. Application June 27, 1949, Serial No. 101,685. In Great Britain June 30, 1948

2 Claims. (Cl. 71—2.5)

The invention relates to preparations for use in horticulture or agriculture for assisting the germination of seeds, the rooting and growth of cuttings and the growth of seedlings and plants and for improving the fertility of the soil.

Briefly stated, the preparation according to the invention is a synthetic colloidal humus having plant foods, trace elements and growth hormones adsorbed onto the surface of each individual colloidal particle.

The process by which it is prepared may be briefly stated as passing a composite solution containing a salt of alginic acid, inorganic plant food substances and plant growth promoting hormones through a bed containing peat which has been inoculated with soil bacteria, the fluid drained from the bed being preferably repassed through the bed until signs of fermentation appear, after which the fluid may be drawn off into containers and allowed to stand for a few hours before sealing so as to ensure that all bacterial activity has been completed.

Examples of the type of growth promoting hormones that can be used are diphenyl acetyl acetone, β-indole-acetic acid, and α-naphthalene acetic acid or phenyl acetic acid.

The fluid preparation thus prepared may be used for the purposes above referred to.

When, however, it is desired to have the preparation in a solid form, the fluid may be precipitated in a suitable bath such as one containing a soluble calcium salt, the resultant precipitate after being strained and the residual liquid being pressed out of it, being finally dried and granulated or ground into a powder.

The inoculation of the peat with bacillus may be effected by the presence in the bed of poultry or animal faeces, it being preferable to arrange the peat and faeces in alternate layers, but the whole may be mixed together, in which case it is desirable to interpose straw or other cellulosic material in order to prevent undue compacting of the mixture.

The invention does not preclude the use of other lyophilic colloids such as agar, carrageen moss, gelatine or fish glue with or in place of the salts of alginic acid.

It is thought that the production of the new preparation or colloid produced according to the invention, is due to the bacilli digesting the colloidal humus and alginate together with the plant foods, trace elements and growth hormones, the secretion of the bacilli being the new colloid.

One mode of carrying out the invention will now be described, by way of example.

100 gallons of a 5% solution in water of ammonium alginate and/or other salt of alginic acid, are prepared.

Inorganic plant food substances, which may include all the major elements and trace elements required for plant growth, to be added to the alginate solution, are prepared by stirring in water the following:

5 oz. mono-calcium phosphate, 5 oz. sodium nitrate, 9 oz. magnesium sulphate and 3⅓ oz. potassium chloride. The trace elements may be provided by adding, with stirring, to 100 gallons of alginate solution, 400 c. c. of a solution of ⅕ oz. ferrous sulphate in ½ gallon of water, and 200 c. c. of a solution of ⅕ oz. boric acid, ⅕ oz. manganese sulphate, ¼ oz. zinc sulphate, and 1/50 oz. copper sulphate in ½ gallon of water. Finally there may be added to 100 gallons of solution, 2 fluid oz. of diphenyl acetyl acetone.

In order to carry out the interaction of the above composite solution with inoculated peat, a bed may be prepared, consisting of layers of forest peat, preferably derived from deciduous trees, or peat from peat bogs preferably taken from the lower strata, a few inches thick, with a thin layer over each layer of peat, of a mixture of 1 cwt. loam, 1 cwt. granulated charcoal, and 10 lbs. of fresh poultry manure or any other fresh animal faeces to which has been added a mixed culture of Bacillus radicicola and Azotobacter chroococcum or any other mixture of soil bacteria. The bed may be from one to two feet thick. The solution is distributed over the bed by a revolving sprinkler or a series of fixed perforated pipes, the temperature of the bed being maintained at about 25° C. if of full thickness or at a lower temperature, but not below 18° C. if a thinner bed is used. The fluid, having penetrated the bed, is collected and returned to the top of the bed, and this is continued until the fluid is seen to be fermenting, after which the fluid is not returned to the top of the bed, but is drawn off into containers and allowed to stand for a few hours before sealing, so as to ensure that all bacterial activity has been completed.

The fluid thus prepared may be used for the purposes referred to above, and in general has an enhanced effect as a result of the fermentation treatment.

While the preparation according to the invention is not restricted to the inclusion of any particular plant foods or nutrients, those described in the formulae set out in "Soilless Growth of Plants," by Ellis and Swaney, are suitable. The new preparation, so obtained, before being distributed on land or places where plants are grown, may be diluted with water. It is of great value in treating land lacking in humus, and as transportation of a fluid may be in some cases difficult, it may be reduced to a dry granular or powdered state. For this purpose the fluid is allowed to run, or is sprayed or dripped into a precipitating bath containing calcium chloride, or other soluble calcium salt of a percentage of from 1 to 5%. The resultant precipitate is strained and the residual fluid pressed out of it, for instance in a similar manner in which fluid is pressed out in a cheese press, the precipitate being finally dried and if desired ground into a powder.

Alternatively, a liquid preparation as above described may be absorbed in bentonite or like material, such as attasol, fuller's earth or kieselguhr, and after drying the material may be re-ground into a powder. Such powder may be used as a normal fertiliser, preferably with the addition of silicates to avoid any clogging effect on the surface of the soil, as a seed dressing, or as a medium for assisting the rooting of cuttings, the prepared cuttings being dipped in the powder before being planted up.

Treatment of soil with preparations in accordance with this invention not only adds essential plant foods, but also is equivalent to the addition of humus or humus-forming materials, whereby the physical condition of the soil as well as its chemical composition is improved and its general fertility is enhanced.

The new preparation is capable of many uses.

In fluid form it may be absorbed by straw, peat or other cellulosic material and stored for a period to produce a valuable compost.

Seeds may be coated with the new preparation to form pellets, or seeds may be spaced in known manner on carriers such as sheets, strips, tapes or cellulosic films which carriers, however, have been treated with the new preparation. The carriers may be of a material which will readily break down in the soil. In the application to seeds, the fluid is preferably co-agulated, for instance the seeds may be coated with the fluid preparation by allowing them to run down a chute on to another chute down which the fluid is flowing. The completely coated seeds are then allowed to fall into a co-agulating bath, e. g. a calcium chloride solution.

I claim:

1. A process for producing colloidal humus for use in horticulture and agriculture consisting in passing a composite solution containing a salt of alginic acid, inorganic plant food substances and plant growth hormones through a bed containing peat which has been inoculated with soil bacteria, collecting the fluid drained from the bed, precipitating said fluid in a bath of soluble calcium salt, straining the precipitate, removing residual fluid therefrom and drying the product so obtained.

2. A process for producing colloidal humus for use in horticulture and agriculture, consisting in passing a composite solution containing a salt of alginic acid, inorganic plant food substances and plant growth promoting hormones through a bed containing peat which has been inoculated with soil bacteria, collecting the fluid drained from the bed, precipitating said fluid by absorption thereof in a calcium salt known as bentonite and drying the product so obtained.

ERIC GEORGE FINCH.

REFERENCES CITED

The following references are of record in the file of this patent:

UNITED STATES PATENTS

| Number | Name | Date |
|---|---|---|
| 550,545 | Thompson | Nov. 26, 1895 |
| 570,813 | Nobbe et al. | Nov. 3, 1896 |
| 1,106,275 | Bottomley | Aug. 4, 1914 |
| 1,228,587 | Nash | June 5, 1917 |
| 1,606,015 | Blackwell | Nov. 9, 1926 |
| 2,129,334 | Northen | Sept. 6, 1938 |

FOREIGN PATENTS

| Number | Country | Date |
|---|---|---|
| 511,948 | Great Britain | Aug. 28, 1939 |